US00RE47288E

(19) United States
(12) Reissued Patent
Logunov et al.

(10) Patent Number: US RE47,288 E
(45) Date of Reissued Patent: Mar. 12, 2019

(54) UNIFORM WHITE COLOR LIGHT DIFFUSING FIBER

(71) Applicant: CORNING INCORPORATED, Corning, NY (US)

(72) Inventors: Stephan Lvovich Logunov, Corning, NY (US); Paul John Shustack, Elmira, NY (US)

(73) Assignee: CORNING INCORPORATED, Corning, NY (US)

(21) Appl. No.: 15/588,031

(22) Filed: May 5, 2017

Related U.S. Patent Documents

Reissue of:
(64) Patent No.: 9,025,923
Issued: May 5, 2015
Appl. No.: 13/713,224
Filed: Dec. 13, 2012

U.S. Applications:
(60) Provisional application No. 61/577,156, filed on Dec. 19, 2011.

(51) Int. Cl.
*G02B 6/02* (2006.01)
*F21V 8/00* (2006.01)
*G02B 6/036* (2006.01)

(52) U.S. Cl.
CPC ..... *G02B 6/001* (2013.01); *G02B 6/02052* (2013.01); *G02B 6/0003* (2013.01); *G02B 6/02395* (2013.01); *G02B 6/03694* (2013.01)

(58) Field of Classification Search
CPC .. G02B 6/02052; G02B 6/001; G02B 6/0003; G02B 6/03694
USPC ..... 385/123
See application file for complete search history.

(56) References Cited

U.S. PATENT DOCUMENTS 7,450,806 B2 11/2008 Bookbinder et al.
8,492,448 B2 7/2013 Dewa et al.
8,545,076 B2 * 10/2013 Bickham ..... G02B 6/0003 362/558
8,620,125 B2 12/2013 Button et al.
8,622,625 B2 * 1/2014 Benjamin ..... G02B 6/02342 385/72
8,724,942 B2 * 5/2014 Logunov ..... F21V 13/02 385/31
8,805,141 B2 8/2014 Fewkes et al.
8,926,143 B2 * 1/2015 Li ..... G02B 6/001 362/311.02

(Continued)

FOREIGN PATENT DOCUMENTS

DE 102008009138 8/2009

OTHER PUBLICATIONS

A.Endruweit et al., Spectroscopic experiments regarding the efficiency of side emission optical fibers in the UV-A and visible blue spectrum, Optics and Lasers in Engineering, 46 (2008), pp. 97-105.

(Continued)

*Primary Examiner* — Deandra M Hughes

(57) ABSTRACT

Light diffusing optical fibers for use in illumination applications and which have a uniform color gradient that is angularly independent are disclosed herein along with methods for making such fibers. The light diffusing fibers are composed of a silica-based glass core that is coated with a number of layers including both a scattering layer and a phosphor layer.

44 Claims, 11 Drawing Sheets

(56) References Cited

U.S. PATENT DOCUMENTS

| | | | | |
|---|---|---|---|---|
| 8,929,703 | B2 * | 1/2015 | Logunov | G02B 6/0003 385/123 |
| 9,093,003 | B2 * | 7/2015 | Logunov | G09F 9/302 |
| 9,541,694 | B2 * | 1/2017 | Tissot | G02B 6/0003 |
| 2005/0074216 | A1 | 4/2005 | Irie | |
| 2010/0053970 | A1 | 3/2010 | Sato et al. | |
| 2010/0066254 | A1 | 3/2010 | Ott et al. | |
| 2011/0037949 | A1 | 2/2011 | Papac et al. | 351/221 |
| 2011/0122646 | A1 * | 5/2011 | Bickham et al. | 362/554 |
| 2011/0188261 | A1 | 8/2011 | Deng | |
| 2013/0010456 | A1 * | 1/2013 | Ishii et al. | 362/97.1 |
| 2013/0107565 | A1 * | 5/2013 | Genier | G02B 6/0003 362/558 |
| 2014/0198520 | A1 * | 7/2014 | Bennett | G02B 6/001 362/556 |
| 2014/0268815 | A1 * | 9/2014 | Li | G02B 6/001 362/311.02 |

OTHER PUBLICATIONS

Patent Cooperation Treaty International Notification of Transmittal of the International Search Report and The Written Opinion of the International Searching Authority, international application No. PCT/US2012/068853: dated Apr. 8, 2013, 12 pages.

Endruweit et al; "Spectroscopic Experiments Regarding the Efficiency of Side Emission Optical Fibres in the UV-A and Visible Blue Spectrum"; Optics and Lasers in Engineering; 46 (2008) 97-105.

Smith et al; "The C.I.E. Colorimetric Standards and Their Use"; Trans. Opt.Soc.; 33 73-134 (1931).

Hsin-Tao Huang et al., Planar Lighting System Using Array of Blue LEDs to Excite Yellow Remote Phosphor Film, Journal of Display Technology, vol. 7, No. 1, Jan. 2011, pp. 44-51.

* cited by examiner

UNIFORM WHITE COLOR LIGHT DIFFUSING FIBER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[This application claims the benefit of priority under 35 USC §119 of U.S. Provisional Application Ser. No. 61/577,156 filed Dec. 19, 2011 the content of which is relied upon and incorporated herein by reference in its entirety.]

*The present application is a reissue application of U.S. patent application Ser. No. 13/713,224, filed Dec. 13, 2012, which claims the benefit of priority under 35 U.S.C. 119(e) of U.S. Provisional Application Ser. No. 61/577,156, filed Dec. 19, 2011.*

FIELD

The present specification generally related to light diffusing optical fibers for use in illumination applications, and, more specifically, to light diffusing optical fibers which have a uniform color gradient that is angularly independent. Methods for making such fibers are also disclosed herein.

BACKGROUND

It has been found that optical fibers that allow for propagation of light radially outwards along the length of the fiber, thereby illuminating the fiber, are particularly useful for a number of applications, such as special lighting, photochemistry, and for use in electronics and display devices. However, there are a number of issues with the current design of light diffusing fibers ("LDF"). One of the issues with the current design is that the angular distribution of different light colors from the fiber may vary depending on the viewing angle, especially for high lm/W cases, such as white LED, when blue light from the light source is mixed with a down converting phosphor. Another issue with light diffusing fibers is the difficulty with using fibers in the ultraviolet wavelength region, where the core of the fiber is transparent, but the coating (a necessary requirement for glass-based fibers) has strong absorptions. The trapping of UV light in the coating means that light extraction from light diffusing fibers is inefficient and moreover, the coating could degrade due to higher UV light exposure. Accordingly, there is a need for alternative light diffusing fiber designs that cure these deficiencies.

SUMMARY

A first embodiment comprises a light diffusing fiber for emitting white light comprising: a core formed from a silica-based glass; a cladding in direct contact with the core; a scattering layer in direct contact with the cladding; and a phosphor layer surrounding and in direct contact with the scattering layer, wherein the color of the light emitted, as measured by the CIE 1931 x, y chromacity space, comprises x from about 0.20 to about 0.30 and y from about 0.25 to about 0.35. In some embodiments, x is from about 0.23 to about 0.28 and y is from about 0.28 to about 0.33. In some embodiments, the color of the light emitted falls within the claimed CIE 1931 x, y values for all viewing angles from about 15° to about 170° relative to the direction of the light diffusing optical fiber. In some embodiments, the light diffusing optical fiber emits light having an intensity along the fiber that does not vary by more than about 20%. In some embodiments, the scattering induced attenuation loss comprises from about 0.1 dB/m to about 50 dB/m at a wavelength of 550 nm.

In some embodiments, the core of the light diffusing fiber comprises a plurality of randomly distributed voids. In some embodiments, the cladding comprises a polymer. In some embodiments, the polymer comprises CDC6. In some embodiments, the scattering layer comprises a polymer. In some embodiments, the polymer comprises CDC6. In some embodiments, the scattering layer comprises a plurality of randomly distributed voids or microparticles or nanoparticles of a scattering material. In some embodiments, the microparticles or nanoparticles comprise $TiO_2$ or $SiO_2$. In some embodiments, the phosphor layer comprises microparticles or nanoparticles of an inorganic phosphorescent or fluorescent material. In some embodiments, the inorganic phosphorescent or fluorescent material comprises CeYAG, NdYAG, quantum dots, or nanoparticles.

In some embodiments, the light diffusing fiber further comprises a light emitting device that emits light with a wavelength from about 300 nm to about 450 nm into the core of the light diffusing fiber. In some embodiments, the light diffusing fiber further comprises a secondary layer in between the cladding and scattering layer.

In another embodiment, the light diffusing fiber may be produced by a method comprising: forming an optical fiber preform comprising a preform core; drawing the optical fiber preform into an optical fiber; coating the optical fiber with at least one cladding layer; coating the optical fiber with at least one scattering layer; and coating the optical fiber with at least one phosphor layer.

BRIEF DESCRIPTION OF THE DRAWINGS

FIG. 3A shows the output from a 160 μm thick polymer coating comprising 35% by weight CeYAG (no scattering layer); FIG. 3B shows the output from a 800 μm thick polymer coating comprising 35% by weight CeYAG with no scattering layer; FIG. 3C shows the output from a 160 μm thick polymer coating comprising 20% by weight CeYAG with no scattering layer; and FIG. 3D shows the output from $TiO_2$ scattering layer (5 μm thick) and a 160 μm thick polymer coating comprising 35% by weight CeYAG layer.

DETAILED DESCRIPTION

Figure 1A:
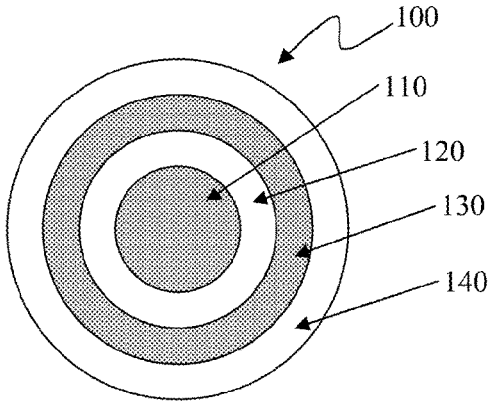
FIGS. 1A and 1B describe a LDF embodiment (100) with a modified coating for uniform scattering (130) along with a phosphor layer (140) for white color generation in both cross-section (FIG. 1A) and parallel section (FIG. 1B).

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and/or C are disclosed as well as a class of substituents D, E, and/or F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings.

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

White Light Fibers

Figure 1B:
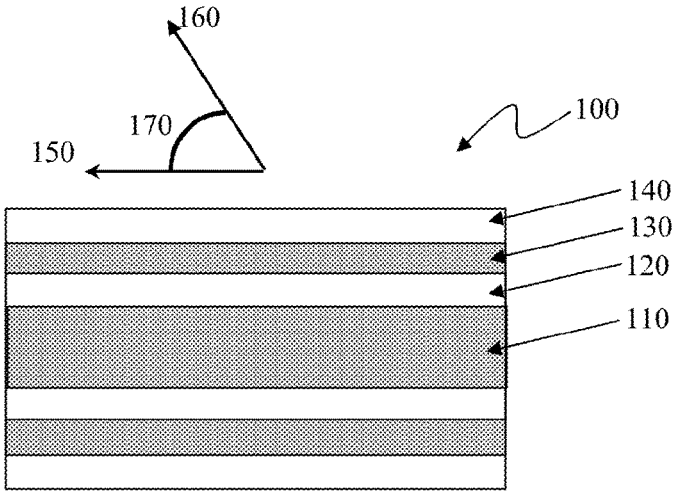
Figure 2A:
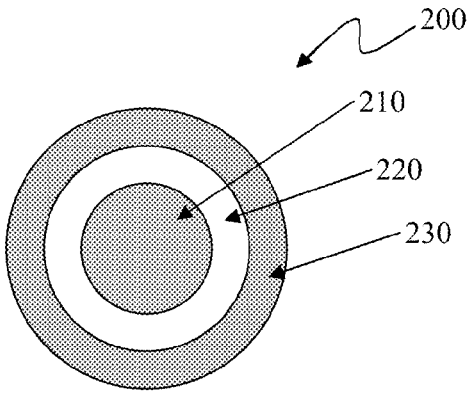
FIGS. 2A and 2B describe a LDF embodiment (200) with a coating modified for uniform scattering of UV light using a scattering layer (230) in combination with a core (210) and cladding (220) case when coating is high absorbance at wavelength of the source.
Figure 2B:
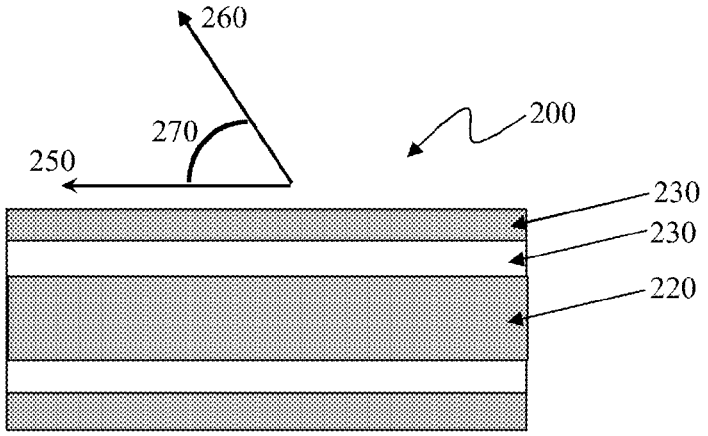

In light diffusing fibers, the dominant component of scattering is at low angles, close to 5-10 degrees, (referencing angle 170 in FIG. 1B or angle 270 in FIG. 2B). Therefore, when yellow light from a phosphor (typically in a coating) is mixed with blue incident light, the resulting color depends on viewing angle. That is because yellow light due to phosphor emission is almost uniform in angular space (independent of angle 170) while the blue light has a strong low angle component (even after scattering). These two facts result in a color asymmetry, with low viewing angles having a dominant blue color and angles greater than 90 degrees have mostly yellow color. Embodiments solve these problems by homogenizing the scattered light in light diffusing fibers to provide light uniform in color as a function of viewing angle.

A first aspect comprises a light diffusing fiber comprising a layer of scattering particles to obtain uniform color output as a function of viewing angle. The desire is to produce a uniform white color output from the light diffusing fiber. Such fibers could be used as replacement for CCFL used in LCD backlight units, but have the additional advantage of being much thinner and therefore could be used with thinner illuminating substrates.

Referring now to FIGS. 1A and 1B, one embodiment of a light diffusing optical fiber 100 is schematically depicted. The light diffusing optical fiber 100 generally comprises a core 110, which further comprises a scattering region. The scattering region may comprise gas filled voids, such as shown in U.S. application Ser. Nos. 12/950,045, 13/097,208, and 13/269,055, herein incorporated by reference, or may comprise the inclusion of particles, such as micro- or nano-particles of ceramic materials, into the fiber core.

The gas filled voids may occur throughout the core, may occur near the interface of the core and cladding 120, or may occur as an annular ring within the core. The gas filled voids may be arranged in a random or organized pattern and may run parallel to the length of the fiber or may be helical (i.e., rotating along the long axis of the fiber). The scattering region may comprise a large number of gas filled voids, for example more than 50, more than 100, or more than 200 voids in the cross section of the fiber. The gas filled voids may contain, for example, $SO_2$, Kr, Ar, $CO_2$, $N_2$, $O_2$, or mixtures thereof. The cross-sectional size (e.g., diameter) of the voids may be from about 10 nm to about 10 μm and the length may vary from about 1 μm to about 50 m. In some embodiments, the cross sectional size of the voids is about 10 nm, 20 nm, 30 nm, 40 nm, 50 nm, 60 nm, 70 nm, 80 nm, 90 nm, 100 nm, 120nm, 140 nm, 160 nm, 180 nm, 200 nm, 250 nm, 300 nm, 400 nm, 500 nm, 600 nm, 700 nm, 800 nm, 1 μm, 2 μm, 3 μm, 4 μm, 5 μm, 6 μm, 7 μm, 8 μm, 9 μm, or 10 μm. In some embodiments, the length of the voids is about 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1000 μm, 5 mm, 10 mm, 50 mm, 100 mm, 500 mm, 1 m, 5 m, 10 m, 20 m, or 50 m.

In the embodiment shown in FIGS. 1A and 1B, the core portion 110 comprises silica-based glass and has an index of refraction, n. In some embodiments, the index of refraction for the core is about 1.458. The core portion 110 may have a radius of from about 10 μm to about 600 μm. In some embodiment the radius of the core is from about 30 μm to about 400 μm. In other embodiments, the radius of the core is about 125 μm to about 300 μm. In still other embodiments, the radius of the core is about 50 μm, 60 μm, 70 μm, 80 μm, 90 μm, 100 μm, 120 μm, 140 μm, 160 μm, 180 μm, 200 μm, 220 μm, 240 μm, or 250 μm.

The voids in the core 110 are utilized to scatter light propagating in the core of the light diffusing optical fiber 100 such that the light is directed radially outward from the core portion 110, thereby illuminating the light diffusing optical fiber and the space surrounding the light diffusing optical fiber. The scatter-induced attenuation may be increased through increasing the concentration of voids, positioning voids throughout the fiber, or in cases where the voids are limited to an annular ring, increasing the width of the annulus comprising the voids will also increase the scattering-induced attenuation for the same density of voids. Additionally, in compositions where the voids are helical, the scattering-induced attenuation may also be increased by varying the pitch of the helical voids over the length of the fiber. Specifically, it has been found that helical voids with a smaller pitch scatter more light than helical voids with a larger pitch. Accordingly, the intensity of the illumination of the fiber along its axial length can be controlled (i.e., predetermined) by varying the pitch of the helical voids along the axial length. The pitch of the helical voids, as used herein, refers to the inverse of the number times the helical voids are wrapped or rotated around the long axis of the fiber per unit length.

Still referring to FIGS. 1A and 1B, the light diffusing optical fiber 100 may further comprise a cladding 120 which surrounds and is in direct contact with the core portion 110. The cladding 120 may be formed from a material which has a low refractive index in order to increase the numerical aperture (NA) of the light diffusing optical fiber 100. In some embodiments, the cladding has a refractive index contrast (as compared to the core) of less than about 1.415. For example, the numerical aperture of the fiber may be greater than about 0.3, and in some embodiments greater than about 0.4. In one embodiment, the cladding 120 comprises a low index polymeric material such as UV or thermally curable fluoroacrylate, such as PC452 available from SSCP Co. Ltd 403-2, Moknae, Ansan, Kyunggi, Korea, or silicone. In other embodiments, the cladding comprises a urethane acrylate, such as CPC6, manufactured by DSM Desotech, Elgin, Ill. In still other embodiments the cladding 120 comprises a silica glass which is down-doped with a down-dopant, such as, for example, fluorine. In some embodiments, the cladding comprises a high modulus coating. The cladding 120 generally has an index of refraction which is less than the index of refraction of the core portion 110. In some embodiments, the cladding 120 is a low index polymer cladding with a relative refractive index that is negative relative to silica glass. For example, the relative refractive index of the cladding may be less than about −0.5% and in some embodiments less than −1%.

The cladding 120 generally extends from the outer radius of the core portion 110. In some embodiments described herein, the radial width of the cladding is greater than about 10 μm, greater than about 20 μm, greater than about 50 μm or greater than about 70μm. In some embodiments, the cladding has a thickness of about 10 μm, 20 μm, 30 μm, 40 μm, 50 μm, 60 μm, 70 μm, 80 μm, 90 μm, or 100 μm.

The light diffusing fiber may also comprise a clear layer of secondary coating typical for all optical fibers for mechanical handling. The scattering layer will be on top of the secondary coating. In some embodiments the secondary coating layer and scattering layer may be combined, depending on how fiber is manufactured. For example, if the scattering layer is applied after initial draw of the fiber, for handling issues it may be necessary to apply a clear secondary coating with a second step being directed to application of the scattering layer and phosphor. This process is similar to postdraw ink application for optical fibers. However, it can be combined in one step in the draw, and in this case secondary coating is not needed and the scattering layer may be applied directly on top of the cladding.

Referring again to FIGS. 1A and 1B, the light diffusing optical fiber 100 further comprises a scattering layer 130 which surrounds and is in direct contact with the cladding 120. The scattering layer may comprise a polymer coating. The polymer coating may comprise be any liquid polymer or prepolymer material into which the scattering agent could be added and in which the blend may be applied to the fiber as a liquid and then converted to a solid after application to the fiber. In some embodiments, the scattering layer 130 comprises a polymer coating such as an acrylate-based, such as CPC6, manufactured by DSM Desotech, Elgin, Ill., or silicone-based polymer further comprising a scattering material. In another embodiment, the cladding 120 comprises a low index polymeric material such as UV or thermally curable fluoroacrylate, such as PC452 available from SSCP Co. Ltd 403-2, Moknae, Ansan, Kyunggi, Korea. In some embodiments, the cladding comprises a high modulus coating. In some embodiments, it was most efficient to blend the scattering agents into standard UV curable acrylate based optical fiber coatings, such as Corning's standard CPC6 secondary optical fiber coating. To make the scattering blends, a concentrate was first made by mixing 30% by weight of the scattering agent into DSM 950-111 secondary CPC6 optical fiber coating and then passing the mix over a 3 roll mill. These concentrates were then either applied directly as coatings or were further diluted with DSM 950-111 to give the desired scattering effect.

In some embodiments, the scattering layer 130 may be utilized to enhance the distribution and/or the nature of the light emitted radially from the core portion 110 and passed through the cladding 120. The scattering material may comprise nano- or microparticles with an average diameter of from about 200 nm to about 10 μm. In some embodiments, the average diameter of the particles is about 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, or 10 μm. The concentration of the scattering particles may vary along the length of the fiber or may be constant and may be a weight percent sufficient to provide even scattering of the light while limiting overall attenuation. In some embodiments, the weight percentage of the scattering particles in the scattering layer comprises about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, or 50%. In some embodiments, the scattering layer comprises small particles of a scattering material which comprise a metal oxides or other high refractive index material, such as $TiO_2$, ZnO, $SiO_2$, or Zr. The scattering material may also comprise micro- or nano-sized particles or voids of law refractive index, such as gas bubbles. The scattering layer generally extends from the outer radius of the cladding 120. In some embodiments described herein, the radial width of the scattering layer is greater than about 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, or 100 μm.

In some embodiments, the scattering material may contain $TiO_2$-based particles, such as a white ink, which provides for an angle independent distribution of light scattered from the core portion 110 of the light diffusing optical fiber 100. In some embodiments, the scattering particles comprise a sublayer within the scattering layer. For example, in some embodiments, the particle sublayer may have a thickness of about 1 μm to about 5 μm. In other embodiments, the thickness of the particle layer and/or the concentration of the particles in the scattering layer may be varied along the axial length of the fiber so as to provide more uniform variation in the intensity of light scattered from the light diffusing optical fiber 100 at large angles (i.e., angles greater than about 15 degrees).

Referring again to FIGS. 1A and 1B, the light diffusing optical fiber 100 further comprises a phosphor layer 140 which surrounds and is in direct contact with the scattering layer 130. The fluorescent or phosphorescent material in the phosphor layer may comprise any organic or inorganic fluorescent or phosphorescent material, but in some embodiments may be an inorganic material. For example, the phosphor layer may comprise CeYAG, NdYAG, quantum dots, nanoparticles, metal-enhanced fluorescence of organic fluorophores, etc.

The phosphor layer may comprise a polymer coating. The polymer coating may comprise be any liquid polymer or prepolymer material into which the fluorescent or phosphorescent material could be added and in which the blend may be applied to the fiber as a liquid and then converted to a solid after application to the fiber. For example, in one embodiment, the phosphor layer 140 comprises a polymer coating such as an acrylate-based or silicone based polymer (e.g., CPC6 secondary coating) further comprising a fluorescent or phosphorescent material that converts light scattered from the core portion 110 to a longer wavelength of light. In some embodiments, it was most efficient to blend the fluorescent or phosphorescent material into standard UV curable acrylate based optical fiber coatings, such as Corning's standard CPC6 secondary optical fiber coating. To make the fluorescent or phosphorescent blend, a concentrate was first made by mixing 30% by weight of the fluorescent or phosphorescent agent into DSM 950-111 secondary CPC6 optical fiber coating and then passing the mix over a 3 roll mill. These concentrates were then either applied directly as coatings or were further diluted with DSM 950-111 to give the desired fluorescent or phosphorescent effect.

In some embodiments, white light can be emitted from the light diffusing optical fiber by coupling the light diffusing optical fiber 100 with a fluorescent or phosphorescent material in the phosphor layer 140 to a higher energy (lower wavelength) light source, such as a UV or near UV light source emitting at 405 nm or 445 nm. In such an embodiments, the diode laser. The UV light from the light source that is scattered from the core portion 110 causes the material in the phosphor layer to fluoresce or phosphoresce such that the combination of UV light and emitted wavelengths produce a white light emission from the light diffusing optical fiber 100. In some embodiments, the source light is from about 300-550 nm, or about 300, 350, 400, 450, 500, or 550 nm.

Referring to FIG. 1B, in the embodiment shown, unscattered light propagates down the light diffusing fiber 100 from the source in the direction shown by arrow 150. Scattered light is shown exiting the light diffusing fiber as arrow 160 at an angle 170, which describes angular difference between the direction of the fiber and the direction of the scattered light when it leaves light diffusing fiber 100. In some embodiments, the UV-visible spectrum of the light diffusing fiber 100 is independent of angle 170. In some embodiments, the intensities of the spectra when angle 170 is 15° and 150° are within ±30% as measured at the peak wavelength. In some embodiments, the intensities of the spectra when angle 170 is 15° and 150° are within ±20%, ±15%, ±10%, or ±5% as measured at the peak wavelength.

Figure 7:
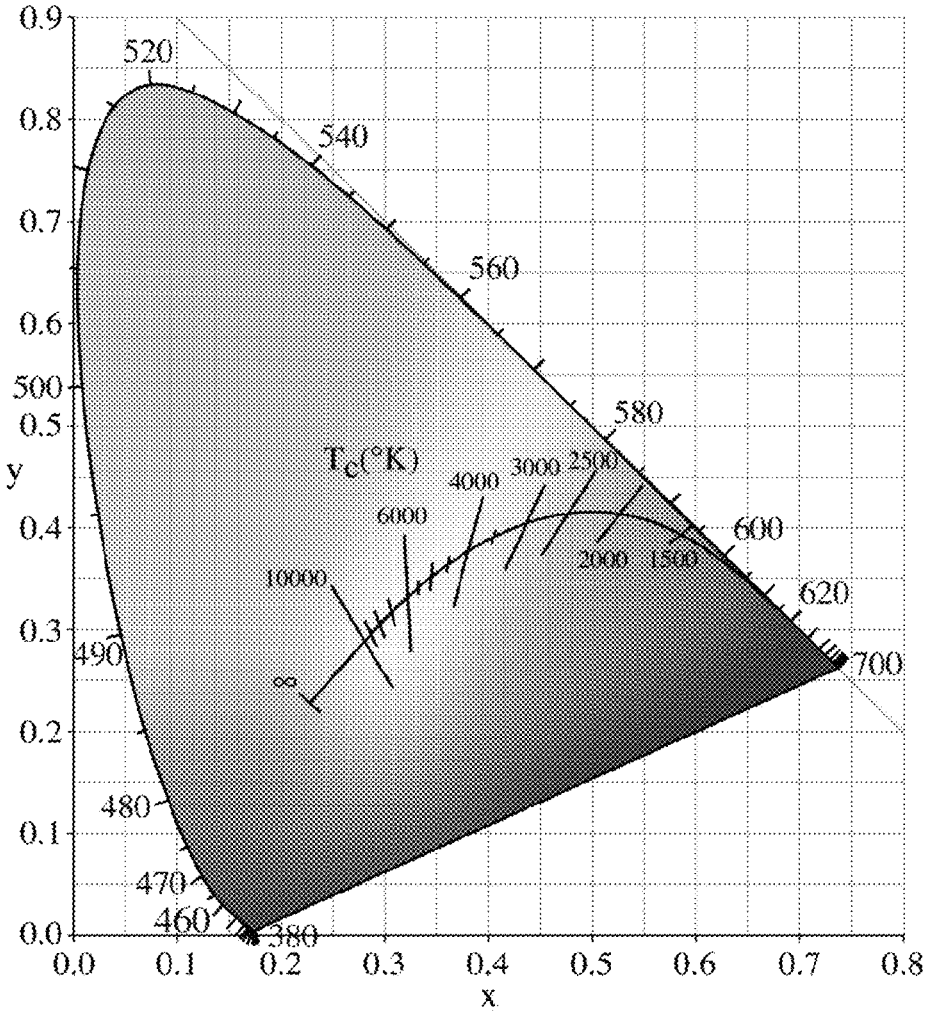
FIG. 7 is a diagram of the CIE 1931 x, y chromaticity space showing the chromacities of black-body light sources of various temperatures and lines of constant correlated color temperature.

In some embodiments, the output of the light diffusing fiber comprises a combination of the scattered incident UV light and the scattered fluorescent or phosphorescent light from the phosphor material to produce a combined light that has the optical property of appearing white. In some embodiments, the combined light has an x coordinate from about 0.15 to about 0.25 and y coordinate of from about 0.20 to about 0.30 when measured on the x- and y-axes of the CIE 1931 x, y chromacity space (T. Smith and J. Guild, The C.I.E. Colorimetric Standards and Their Use, 33 Trans. Op. Soc. 73-134 (1931) herein incorporated by reference in its entirety) (see FIG. 7). In some embodiments, the combined light has an x coordinate from about 0.18 to about 0.23, or about 0.15, 0.16, 0.17, 0.18, 0.19, 0.20, 0.21, 0.22, 0.23, 0.24, or 0.25 on the CIE 1931 x, y chromacity space. In some embodiments, the combined light has a y coordinate from about 0.23 to about 0.27, or about 0.20, 0.21, 0.22, 0.23, 0.24, 0.25, 0.26, 0.27, 0.28, 0.29, or 0.30 on the CIE 1931 x, y chromacity space.

In some embodiments, the values of the x and y coordinates of the CIE 1931 x, y chromacity space do not vary more than ±30% with angle 170 when angle 170 is from about 10° to about 170°. In some embodiments, the values of the x and y coordinates of the CIE 1931 x, y chromacity space at angles 170 of 15° and 150° are within ±30%, ±25%, ±20%, ±15%, ±10%, or ±5% of each other.

In some embodiments described herein the light diffusing optical fibers will generally have a length from about 100 m to about 0.15 m. In some embodiments, the light diffusing optical fibers will generally have a length of about 100 m, 75 m, 50 m, 40 m, 30 m, 20 m, 10 m, 9 m, 8 m, 7 m, 6 m, 5 m, 4 m, 3 m, 2 m, 1 m, 0.75 m, 0.5 m, 0.25 m, 0.15 m, or 0.1 m.

Further, the light diffusing optical fibers described herein have a scattering induced attenuation loss of greater than about 0.2 dB/m at a wavelength of 550 nm. For example, in some embodiments, the scattering induced attenuation loss may be greater than about 0.5 dB/m, 0.6 dB/m, 0.7 dB/m, 0.8 dB/m, 0.9 dB/m, 1 dB/m, 1.2 dB/m, 1.4 dB/m, 1.6 dB/m, 1.8 dB/m, 2.0 dB/m, 2.5 dB/m, 3.0 dB/m, 3.5 dB/m, or 4 dB/m, 5 dB/m, 6 dB/m, 7 dB/m, 8 dB/m, 9 dB/m, 10 dB/m, 20 dB/m, 30 dB/m, 40 dB/m, or 50 dB/m at 550 nm.

As described herein, the light diffusing fiber can be constructed to produce uniform illumination along the entire length of the fiber or uniform illumination along a segment of the fiber which is less than the entire length of the fiber. The phrase "uniform illumination," as used herein, means that the intensity of light emitted from the light diffusing fiber does not vary by more than 25% over the specified length.

The fibers described herein may be formed utilizing various techniques. For example, the core 110 can be made by any number of methods which incorporate voids or particles into the glass fiber. For example, methods for forming an optical fiber preform with voids are described in, for example, U.S. patent application Ser. No. 11/583,098, which is incorporated herein by reference. Additional methods of forming voids may be found in, for example, U.S. application Ser. Nos. 12/950,045, 13/097,208, and 13/269,055, herein incorporated by reference. Generally, the optical fiber is drawn from an optical fiber preform with a fiber take-up system and exits the draw furnace along a substantially vertical pathway. In some embodiments, the fiber is rotated as it drawn to produce helical voids along the long axis of the fiber. As the optical fiber exits the draw furnace, a non-contact flaw detector may be used to examine the optical fiber for damage and/or flaws that may have occurred during the manufacture of the optical fiber. Thereafter, the diameter of the optical fiber may be measured with non-contact sensor. As the optical fiber is drawn along the vertical pathway, the optical fiber may optionally be drawn through a cooling system which cools the optical fiber prior to the coatings being applied to the optical fiber.

After the optical fiber exits the draw furnace or optional cooling system, the optical fiber enters at least one coating system where one or more polymer layers (i.e., the polymeric cladding material, the scattering layer, and/or the phosphor layer) are applied to the optical fiber. As the optical fiber exits the coating system, the diameter of the optical fiber may be measured with non-contact sensor. Thereafter, a non-contact flaw detector is used to examine the optical fiber for damage and/or flaws in the coating that may have occurred during the manufacture of the optical fiber.

UV Fibers

Another aspect comprises a light diffusing fiber with high efficiencies of light extraction at wavelengths where the fiber cladding has high absorptions, such as below 450 nm. Using LDF for UV wavelengths helps to extend the range of applications for photoreactors, water/air purification, acrylate polymerizations and related. Popular desired wavelengths that are used for photoreactions (i.e. less than about 400 nm) and typical UV curable polymers have strong absorptions at this wavelength due to the need for photoinitiators. Embodiments herein improve the efficiency of the light extraction from LDF, which is normally trapped in the high index secondary coating. One notable use of the LDF fiber at this wavelength would be the ability to place light in remote, small, and difficult to access locations for curing UV materials.

In a first aspect, scattering centers (transparent at wavelengths less than about 400 nm), such as small silica particles, are added to the fiber as a scattering layer so that the light is scattered from the scattering coating without significant propagation. This allows for an efficient LDF even at wavelengths where the coating does absorb light. In some embodiments, the low index glass cladding may be replaced with low index F/B co-doped glass cladding. This type of cladding doesn't give as high an NA as in the case of a low index polymer used as a cladding, but is high enough for a wide range of applications.

Referring now to FIGS. 2A and 2B, one embodiment of a light diffusing optical fiber 200 is schematically depicted. The light diffusing optical fiber 200 generally comprises a core 210, which further comprises a scattering region. The scattering region may comprise gas filled voids, such as shown in U.S. application Ser. Nos. 12/950,045, 13/097,208, and 13/269,055, herein incorporated by reference, or may comprise the inclusion of particles, such as micro- or nano-particles, into the fiber core.

The gas filled voids may occur throughout the core, may occur near the interface of the core and cladding 220, or may occur as an annular ring within the core. The gas filled voids may be arranged in a random or organized pattern and may run parallel to the length of the fiber or may be helical (i.e., rotating along the long axis of the fiber). The scattering region may comprise a large number of gas filled voids, for example more than 50, more than 100, or more than 200 voids in the cross section of the fiber. The gas filled voids may contain, for example, $SO_2$, Kr, Ar, $CO_2$, $N_2$, $O_2$, or mixtures thereof. The cross-sectional size (e.g., diameter) of the voids may be from about 10 nm to about 10 μm and the length may vary from about 1 μm to about 50 m. In some embodiments, the cross sectional size of the voids is about 10 nm, 20 mm, 30 nm, 40 nm, 50 nm, 60 nm, 70 nm, 80 nm, 90 nm, 100 nm, 120 nm, 140 nm, 160 nm, 180 nm, 200 nm, 250 nm, 300 nm, 400 nm, 500 nm, 600 nm, 700 nm, 800 nm, 1 μm, 2 μm, 3 μm, 4 μm, 5 μm, 6 μm, 7 μm, 8 μm, 9 μm, or 10 μm. In some embodiments, the length of the voids is about 1 μm, 2 μm, 3 μm, 4 μm, 5 μm, 6 μm, 7μm, 8 μm, 9 μm, 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1000 μm, 5 mm, 10 mm, 50 mm, 100 mm, 500 mm, 1 m, 5 m, 10 m, 20 m, or 50 m.

In the embodiment shown in FIGS. 2A and 2B, the core portion 210 comprises silica-based glass and has an index of refraction, n. In some embodiments, the index of refraction for the core is about 1.458. The core portion 210 may have a radius of from about 10 μm to about 600 μm. In some embodiment the radius of the core is from about 30 μm to about 400 μm. In other embodiments, the radius of the core is from about 125 μm to about 300 μm. In still other embodiments, the radius of the core is about 50 μm, 60 μm, 70 μm, 80 μm, 90 μm, 100 μm, 120 μm, 140 μm, 160 μm, 180 μm, 200 μm, 220 μm, 240 μm, or 250 μm.

The voids in the core 210 are utilized to scatter light propagating in the core of the light diffusing optical fiber 200 such that the light is directed radially outward from the core portion 210, thereby illuminating the light diffusing optical fiber and the space surrounding the light diffusing optical fiber. The scatter-induced attenuation may be increased through increasing the concentration of voids, positioning voids through out the fiber, or in cases where the voids are limited to an annular ring, increasing the width of the annulus comprising the voids will also increase the scattering-induced attenuation for the same density of voids. Additionally, in compositions where the voids are helical, the scattering-induced attenuation may also be increased by varying the pitch of the helical voids over the length of the fiber. Specifically, it has been found that helical voids with a smaller pitch scatter more light than helical voids with a larger pitch. Accordingly, the intensity of the illumination of the fiber along its axial length can be controlled (i.e., predetermined) by varying the pitch of the helical voids along the axial length. The pitch of the helical voids, as used herein, refers to the inverse of the number times the helical voids are wrapped or rotated around the long axis of the fiber per unit length.

Still referring to FIGS. 2A and 2B, the light diffusing optical fiber 200 may further comprise a cladding 220 which surrounds and is in direct contact with the core portion 210. In some embodiments, the cladding comprises a fluorine and boron co-doped glass. In some embodiments, the cladding comprises a polymer. The cladding 220 may be formed from a material which has a low refractive index in order to increase the numerical aperture (NA) of the light diffusing optical fiber 200. In some embodiments, the cladding has a refractive index contrast (as compared to the core) of less than about 1.415. For example, the numerical aperture of the fiber may be greater than about 0.3, and in some embodiments, greater than about 0.4. In one embodiment, the cladding 220 comprises a low index polymeric material such as UV or thermally curable fluoroacrylate, such as PC452 available from SSCP Co. Ltd 403-2, Moknae, Ansan, Kyunggi, Korea, or silicone. In other embodiments, the cladding comprises a urethane acrylate, such as CPC6, manufactured by DSM Desotech, Elgin, Ill. In other embodiments the cladding 220 may be formed from silica glass which is down-doped with a down-dopant, such as, for example, fluorine and boron. The cladding 220 generally has an index of refraction which is less than the index of refraction of the core portion 210. In some embodiments, the cladding 220 is a low index polymer cladding with a relative refractive index that is negative relative to silica glass. For example, the relative refractive index of the cladding may be less than about −0.5% and in some embodiments less than −1%.

The cladding 220 generally extends from the outer radius of the core portion 210. In some embodiments described herein, the radial width of the cladding is greater than about 10 μm, greater than about 20 μm, greater than about 50 μm or greater than about 70 μm. In some embodiments, the cladding has a thickness of about 10 μm, 20 μm, 30 μm, 40 μm, 50 μm, 60 μm, 70 μm, 80 μm, 90 μm, or 100 μm.

The light diffusing fiber may also comprise a clear layer of secondary coating typical for mechanical handling. In the case of UV scattering fibers, it is possible to minimize the thickness of any secondary coatings that may absorb UV radiation. The scattering layer will be on top of the secondary coating. In some embodiments the secondary coating layer and scattering layer may be combined, depending on how fiber is manufactured. For example, if the scattering layer is applied after initial draw of the fiber, for handling issues it may be necessary to apply a clear secondary coating with a second step being directed to application of the scattering layer and phosphor. This process is similar to postdraw ink application for optical fibers. However, it can be combined in one step in the draw, and in this case secondary coating is not needed and the scattering layer may be applied directly on top of the cladding.

Referring again to FIGS. 2A and 2B, the light diffusing optical fiber 200 further comprises a scattering layer 230 which surrounds and is in direct contact with the cladding 220. For example, in one embodiment, the scattering layer 230 comprises a polymer coating such as an acrylate-based or silicone based polymer further comprising a scattering material. In at least some embodiments, the coating layer 210 has a constant diameter along the length of the light diffusing optical fiber.

In some embodiments, the scattering layer 230 may be utilized to enhance the distribution and/or the nature of the light emitted radially from the core portion 210 and passed through the cladding 220. The scattering layer may comprise a polymer coating. The polymer coating may comprise be any liquid polymer or prepolymer material into which the scattering agent could be added and in which the blend may be applied to the fiber as a liquid and then converted to a solid after application to the fiber. In some embodiments, the scattering layer 230 comprises a polymer coating such as an acrylate-based, such as CPC6, manufactured by DSM Desotech, Elgin, Ill., or silicone-based polymer further comprising a scattering material. In another embodiment, the cladding 220 comprises a low index polymeric material such as UV or thermally curable fluoroacrylate, such as PC452 available from SSCP Co. Ltd 403-2, Moknae, Ansan, Kyunggi, Korea. In some embodiments, the cladding comprises a high modulus coating. In some embodiments, it was most efficient to blend the scattering agents into standard UV curable acrylate based optical fiber coatings, such as Corning's standard CPC6 secondary optical fiber coating. To make the scattering blends, a concentrate was first made by mixing 30% by weight of the scattering agent into DSM 950-111 secondary CPC6 optical fiber coating and then passing the mix over a 3 roll mill. These concentrates were then either applied directly as coatings or were further diluted with DSM 950-111 to give the desired scattering effect.

In some embodiments, the scattering layer 230 may be utilized to enhance the distribution and/or the nature of the light emitted radially from the core portion 210 and passed through the cladding 220. The scattering material may comprise nano- or microparticles with an average diameter of from about 200 nm to about 10 μm. In some embodiments, the average diameter of the particles is about 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, or 10 μm. The concentration of the scattering particles may vary along the length of the fiber or may be constant and may be a weight percent sufficient to provide even scattering of the light while limiting overall attenuation. In some embodiments, the weight percentage of the scattering particles comprises about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, or 50%. In some embodiments, the scattering layer comprises a scattering material that is not significantly absorbent in the UV region of incident beam. In some embodiments the scattering material comprises metal oxides or other materials with low absorbance in the region from about 350 nm to about 420 nm, such as $SiO_2$ or Zr, or may comprise nano- to microscale voids comprising a gas, such as oxygen, nitrogen, or a noble gas. The scattering layer generally extends from the outer radius of the cladding 220. In some embodiments described herein, the radial width of the scattering layer is greater than about 10 μm, 20 μm, 30 μm, 40 μm, 50 μm, 60 μm, 70 μm, 80 μm, 90 μm, or 100 μm.

In some embodiments, the scattering material may contain $SiO_2$-based particles, which provides for an angle independent distribution of light scattered from the core portion 210 of the light diffusing optical fiber 200. In some embodiments, the particles comprise a layer within the scattering layer. For example, in some embodiments, the particle layer may have a thickness of about 1 μm to about 5 μm. In other embodiments, the thickness of the scattering layer may be varied along the axial length of the fiber so as to provide more uniform variation in the intensity of light scattered from the light diffusing optical fiber 200 at large angles (i.e., angles greater than about 15 degrees).

Referring to FIG. 2B, in the embodiment shown, unscattered light propagates down the light diffusing fiber 200 from the source in the direction shown by arrow 250. Scattered light is shown exiting the light diffusing fiber as arrow 260 at an angle 270, which describes angular difference between the direction of the fiber and the direction of the scattered light when it leaves light diffusing fiber 200. In some embodiments, the UV-visible spectrum of the light diffusing fiber 200 is independent of angle 270. In some embodiments, the intensities of the spectra when angle 270 is 15° and 150° are within ±30% as measured at the peak wavelength. In some embodiments, the intensities of the spectra when angle 270 is 15° and 150° are within ±20%, ±15%, ±10%, or ±5% as measured at the peak wavelength.

In some embodiments described herein the light diffusing optical fibers will generally have a length from about 100 m to about 0.15 m. In some embodiments, the light diffusing optical fibers will generally have a length of about 100 m, 75 m, 50 m, 40 m, 30 m, 20 m, 10 m, 9 m, 8 m, 7 m, 6 m, 5 m, 4 m, 3 m, 2 m, 1 m, 0.75 m, 0.5 m, 0.25 m, 0.15 m, or 0.1 m.

Further, the light diffusing optical fibers described herein have a scattering induced attenuation loss of greater than about 0.2 dB/m at a wavelength of 300 nm, 325 nm, 350 nm, 375 nm, 400 nm, 425 nm, or 450 nm. For example, in some embodiments, the scattering induced attenuation loss may be greater than about 0.5 dB/m, 0.6 dB/m, 0.7 dB/m, 0.8 dB/m, 0.9 dB/m, 1 dB/m, 1.2 dB/m, 1.4 dB/m, 1.6 dB/m, 1.8 dB/m, 2.0 dB/m, 2.5 dB/m, 3.0 dB/m, 3.5 dB/m, 4 dB/m, 5 dB/m, 6 dB/m, 7 dB/m, 8 dB/m, 9 dB/m, 10 dB/m, 20 dB/m, 30 dB/m, 40 dB/m, or 50 dB/m at 300 nm, 325 nm, 350 nm, 375 nm, 400 nm, 425 nm, or 450 nm.

As described herein, the light diffusing fiber may be constructed to produce uniform illumination along the entire length of the fiber or uniform illumination along a segment of the fiber which is less than the entire length of the fiber. The phrase "uniform illumination," as used herein, means that the intensity of light emitted from the light diffusing fiber does not vary by more than 25% over the specified length.

The fibers described herein may be formed utilizing various techniques. For example, the core 210 can be made by any number of methods which incorporate voids are particles into the glass fiber. For example, methods for forming an optical fiber preform with voids are described in, for example, U.S. patent application Ser. No. 11/583,098, which is incorporated herein by reference. Additional methods of forming voids may be found in, for example, U.S. application Ser. Nos. 12/950,045, 13/097,208, and 13/269,055, herein incorporated by reference. Generally, the optical fiber is drawn from an optical fiber preform with a fiber take-up system and exits the draw furnace along a substantially vertical pathway. In some embodiments, the fiber is rotated as it drawn to produce helical voids along the long axis of the fiber. As the optical fiber exits the draw furnace, a non-contact flaw detector may be used to examine the optical fiber for damage and/or flaws that may have occurred during the manufacture of the optical fiber. Thereafter, the diameter of the optical fiber may be measured with non-contact sensor. As the optical fiber is drawn along the vertical pathway, the optical fiber may optionally be drawn through a cooling system which cools the optical fiber prior to the coatings being applied to the optical fiber.

After the optical fiber exits the draw furnace or optional cooling system, the optical fiber enters at least one coating system where one or more polymer layers (i.e., the polymeric cladding material and/or the scattering layer) are applied to the optical fiber. As the optical fiber exits the coating system, the diameter of the optical fiber may be measured with non-contact sensor. Thereafter, a non-contact flaw detector is used to examine the optical fiber for damage and/or flaws in the coating that may have occurred during the manufacture of the optical fiber.

EXAMPLES

In order to efficiently make samples a mini-recoat tower was assembled. This small tower has the advantage that any existing fiber can be over-coated offline with a layer of UV curable coating. The cure was accomplished by the use of a 200 W Hg-lamp and draw speed of ~0.1 m/s. Three options were tested to provide uniform angular distribution of the scattering light from the fiber:

Option 1—A fiber comprising a silica core, a polymer cladding, a scattering layer, and a phosphor layer. The scattering layer comprised silica particles in a polymer and the phosphor layer comprised CeYAG in a polymer. The refractive index of the polymer cladding was 1.55, and silica was ~1.46, so with the significant index mismatch and small size of silica particles (~1 μm), it was posited that it may be possible to achieve uniform scattering diagram as a function of angle relative to incident angle.

Option 2—A fiber comprising a silica core, a polymer cladding, and a single layer comprising both the phosphor layer and the scattering medium. CeYAG particles have a refractive index of about 1.8, and as such have a significant mismatch with polymer cladding (~1.55). But since CeYAG the particles used were large (~3-4 μm), it was assumed that they would not produce significant scattering.

Option 3—A fiber comprising a silica core, a polymer cladding, a scattering layer, and a phosphor layer. The scattering layer uses high efficient scatterers, such as white ink ($TiO_2$ based filled polymer). $TiO_2$ has high refractive index (~2.5), so it may be a more efficient scatterer than $SiO_2$ particles. However, $TiO_2$ absorbs light at wavelength <400 nm and is less suitable for UV light applications.

In each case the thickness of each layer and concentration of the dopant was modified to obtain optimum spectrum and angular dependence. In FIGS. 1A and 1B are shown a scattering layer and layer doped with phosphor particles. This design was used for white color fibers. In FIGS. 2A and 2B are shown a fiber design for UV emission with a secondary coating doped with scattering particles for uniform angular dependence.

Figure 3A:
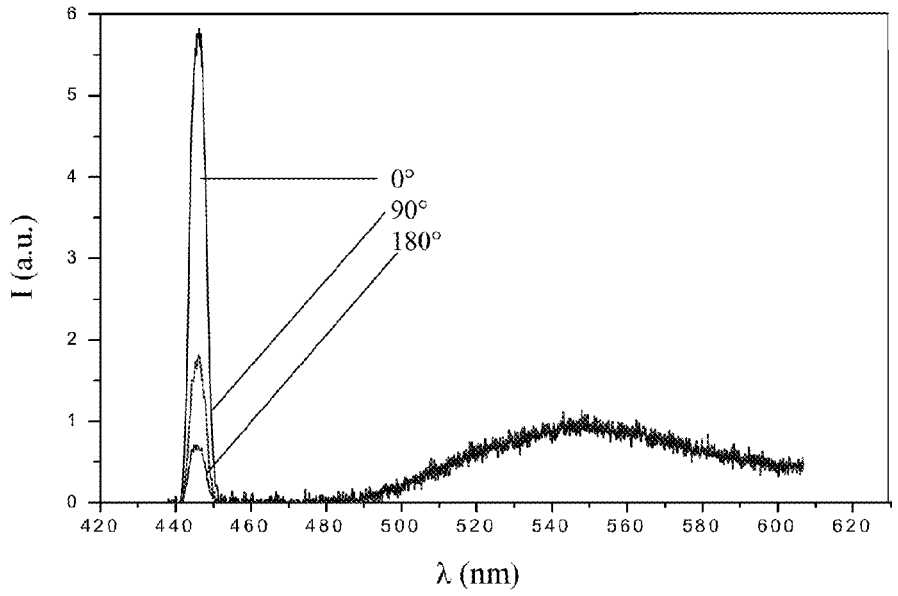
FIG. 3A-D are spectra of different embodiments as a function of angle.
Figure 3B:
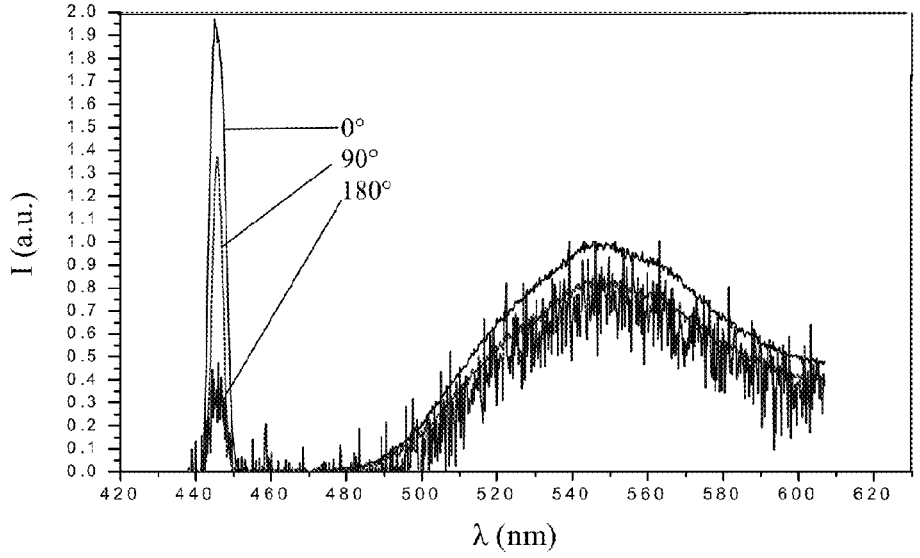
Figure 3C:
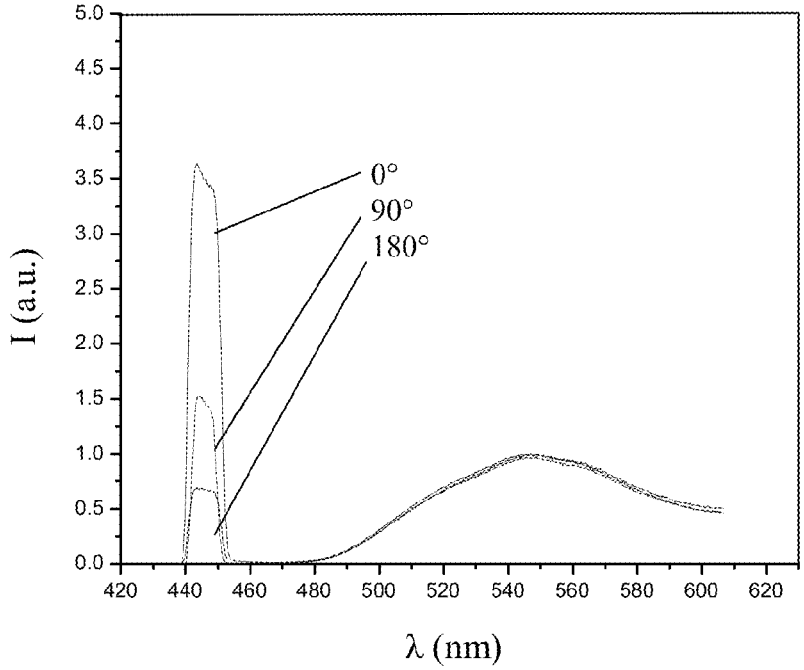

The scattering emission spectra of various fibers are shown in FIGS. 3A-3D. The incident light had a wavelength of 445 nm and the silica fiber used was a random airline fiber. As can be seen in FIGS. 3A-3C, a 160 μm-thick single layer of 35 wt. % CeYAG with no scattering material (FIG. 3A), a 800 μm-thick single layer of 35 wt. % CeYAG with no scattering material (FIG. 3B), and a 160 μm-thick single layer of 20 wt. % CeYAG with no scattering material (FIG. 3C) all failed to provide sufficient scattering to over come the angular dependence of light color, i.e., the color of the emitted light appeared more blue as angle 170 of FIG. 1 approached 0°. Additionally, it was found that changing the diameter and amount of CeYAG in the phosphor layer showed that spectrum of scattered light changes very strongly as function of viewing angle and the amount of CeYAG present.

Figure 3D:
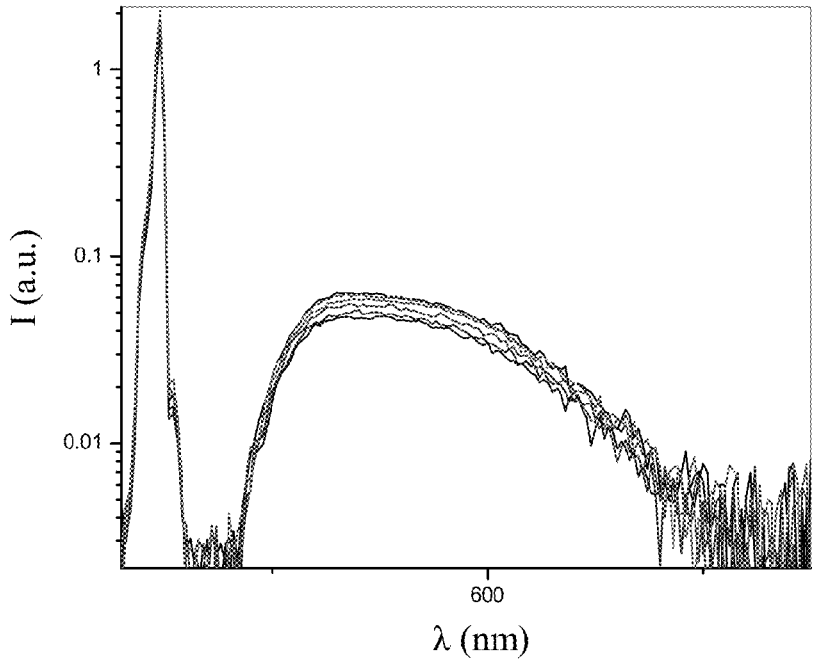

FIG. 3D shows a number of spectra arising from a fiber comprising a scattering layer comprising $TiO_2$ particles (4 μm-thick layer) plus a 160 μm-thick layer of 35 wt. % CeYAG as a function of angle. As can be seen from the spectra, the combination of a scattering layer and phosphor layer provides light emission from the fiber that is independent of viewing angle.

Figure 4:
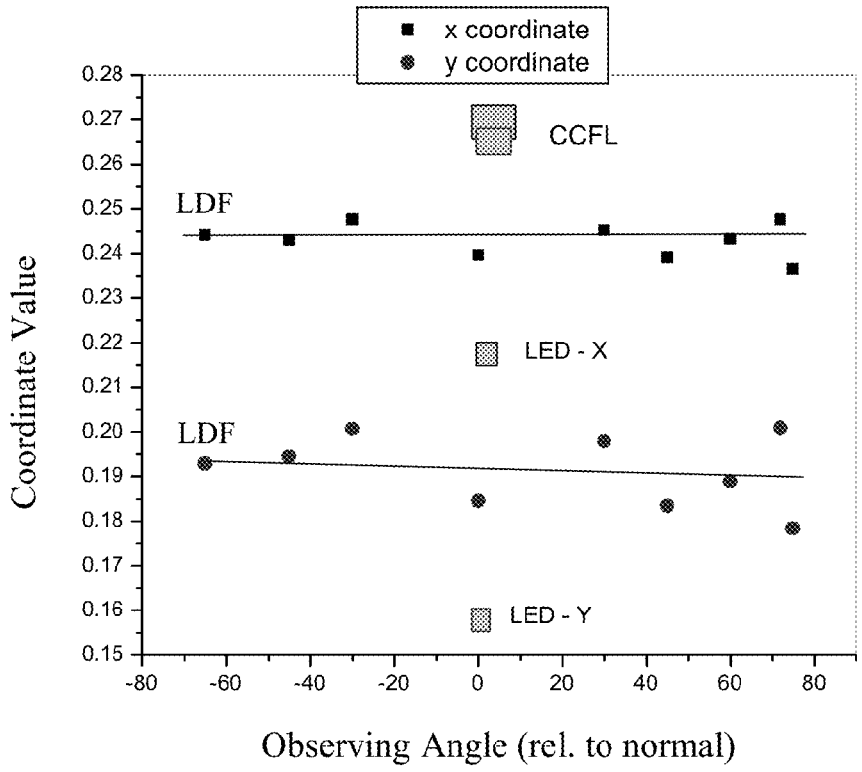
FIG. 4 shows the angular dependence of color coordinates (based on CIE 1931 x, y chromaticity space) for a white LDF embodiment (shown in FIG. 3D) as compared to data for a white LED and CCFL.

FIG. 4 shows a color coordinated comparison using CIE 1931 x, y chromaticity space values for an embodiment (comprising a silica core, polymer cladding, scattering layer (4 μm-thick layer of $TiO_2$) and phosphor layer (160 μm-thick layer of 35 wt. % CeYAG)) is compared to a white LED (which also uses CeYAG in combination with a 460 nm blue LED to obtain white light) and CCFL. The color coordinates of the light diffusing fiber place the color output well within the region of what is considered white light (see FIG. 7). Further, as can be seen from the chart, the color is independent of viewing angle.

Figure 5:
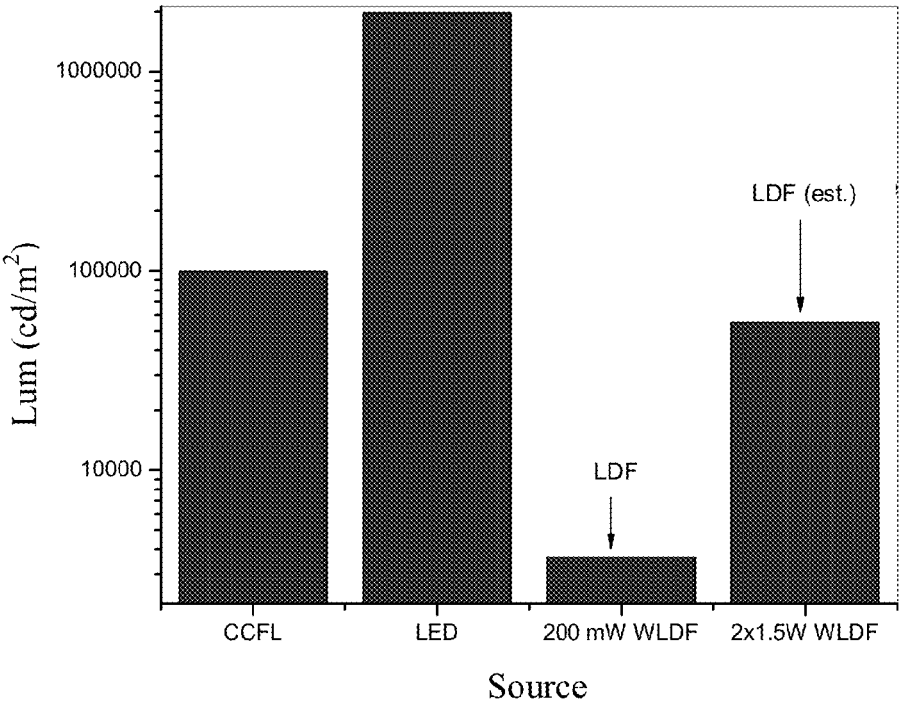
FIG. 5 describes the luminance per area comparison for a white LED strip (backlight for LG display), a CCFL for LG backlight illumination, and a white LDF embodiment (as in FIG. 3D and FIG. 4) with a 200 mW source, and the white LDF (as in FIG. 3D and FIG. 4) embodiment output using 2×1.5 W 445 laser diodes. The LDF was illuminated from both sides using 50% MM coupler. Use of two compact 445 nm laser sources places the current approximately 1 m long white LDF on the same luminance level as a standard CCFL.
Figure 6:
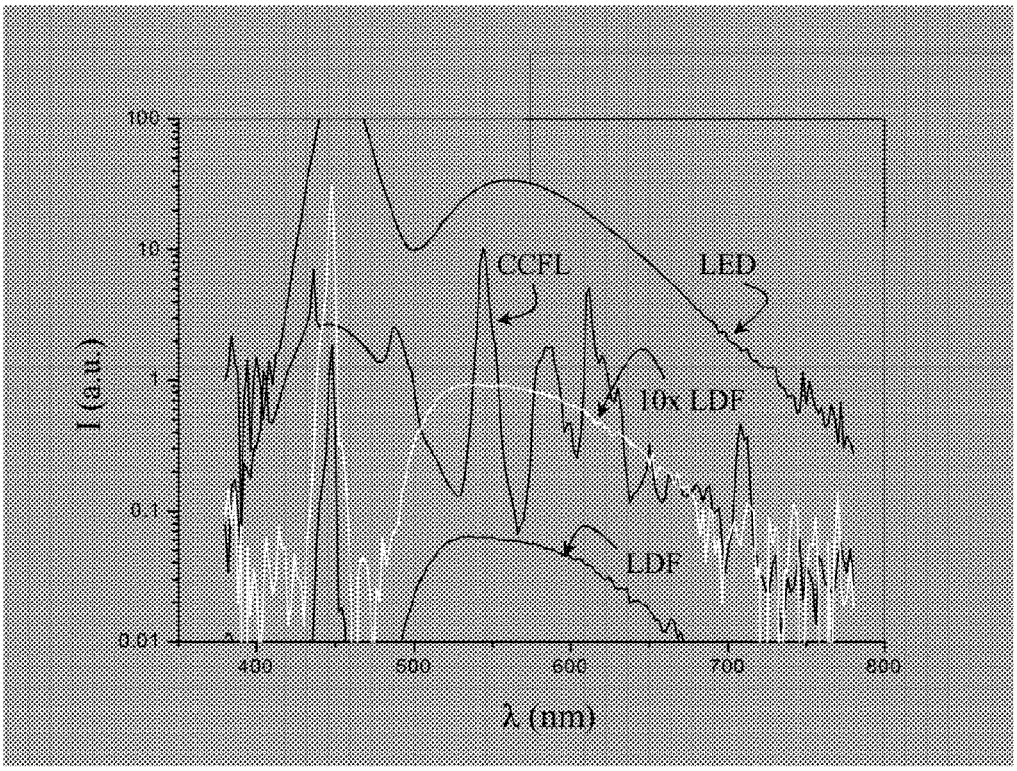
FIG. 6 is comparison of spectra of white LED, CCFL and white LDF embodiment.

Theoretical projections of the fiber brightness (FIG. 5) show that it would be possible to reach the same brightness as CCFL for liquid crystal displays using two laser diodes with 1.5 W power, which are commercially available for very low costs.

Different amounts of scattering particles and CeYAG particles were used in order to provide the right combination of scattering and absorption of 445 nm light, while still allowing sufficient non-absorbed 445 nm light provides the necessary blue color to make white light. The best results were obtained using about 35% by weight CeYAG and thicknesses of about 160 μm. Additionally, this amount gave reasonable viscosity to the secondary coating so it can be applied in a regular way to fiber in draw tower. It was also found that by bringing light in from two sides of the LDF, it was possible to obtain more even uniform illumination both angularly and along the length of the fiber (FIG. 11).

Figure 8:
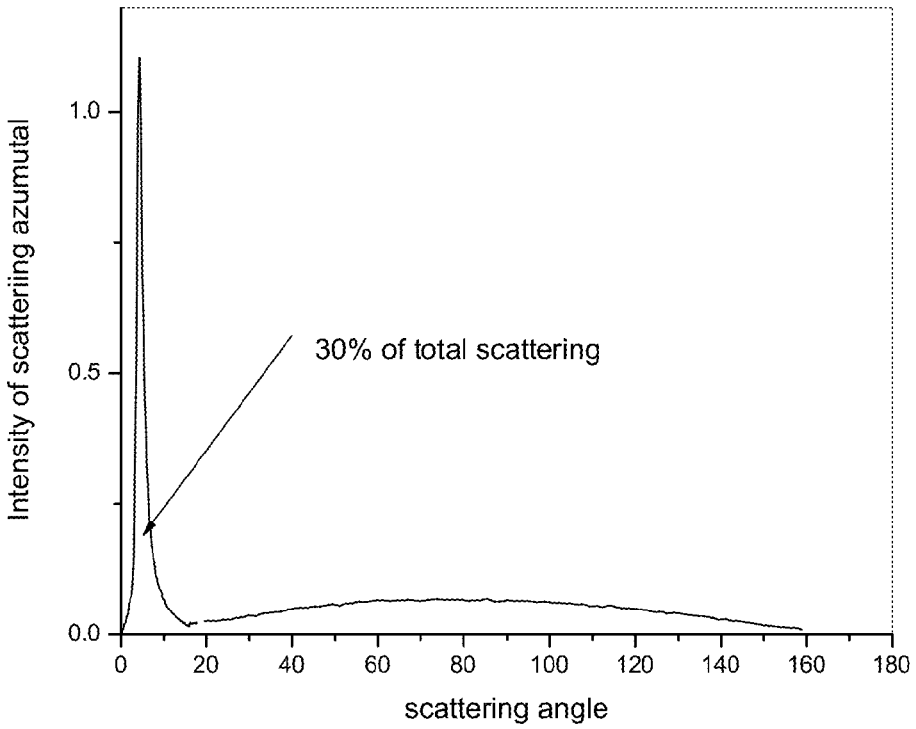
FIG. 8 shows the angular dependence of light scattering for an UV diffusing LDF embodiment with standard cladding of CPC6.
Figure 9:
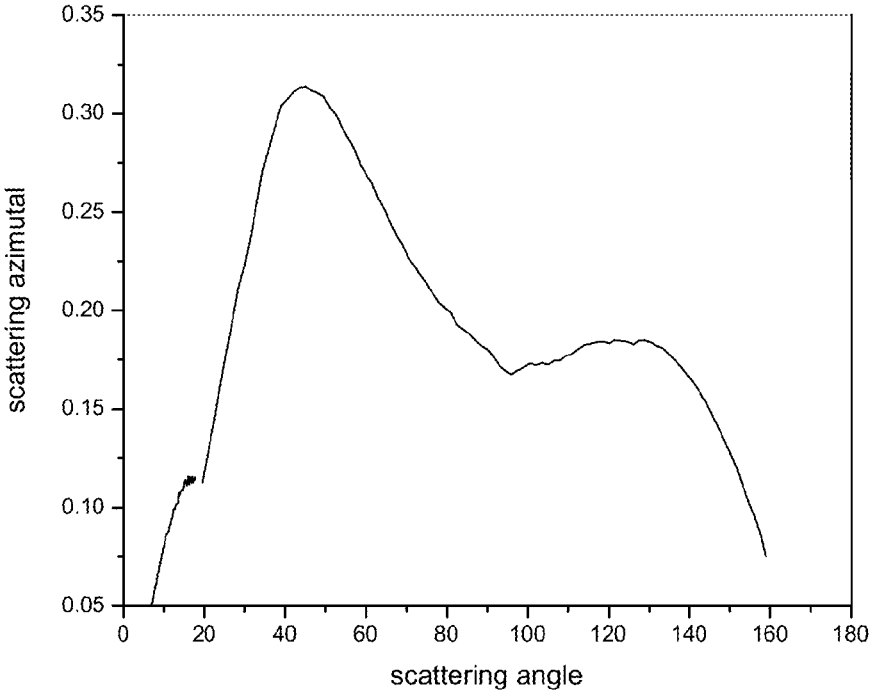
FIG. 9 shows the angular dependence of light scattering for UV diffusing LDF embodiment with a cladding of CPC6 and a scattering layer of CPC6 (100 μm) doped with ~2 microns spherical silica particles.
Figure 10:
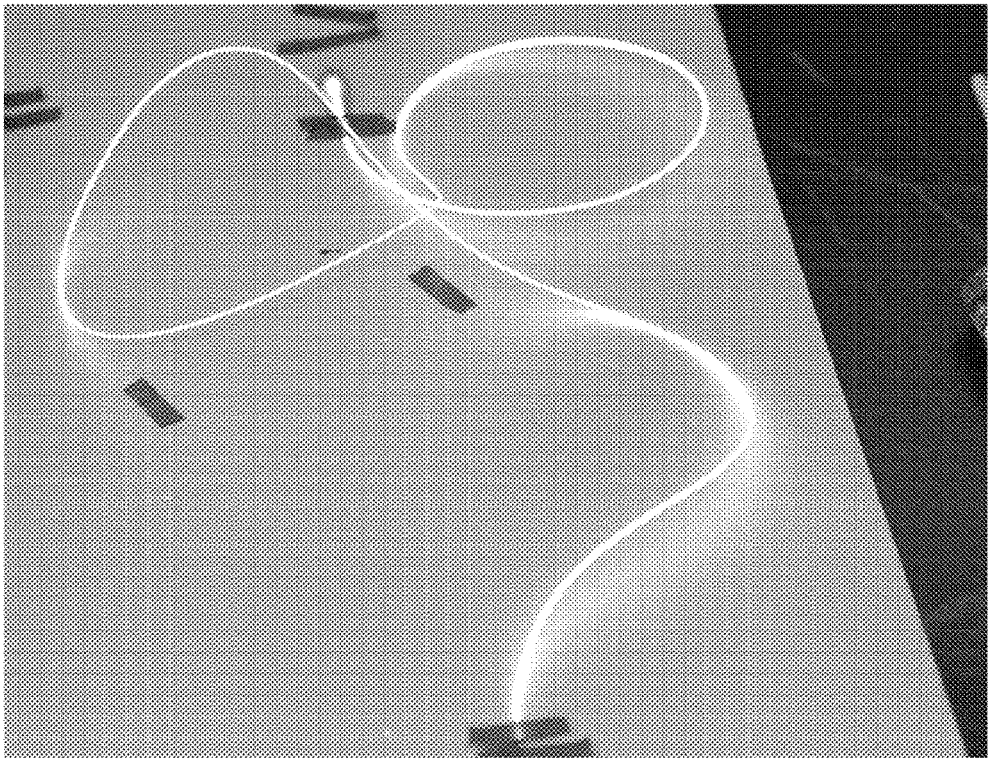
FIG. 10 is an image of white color LDF (FIG. 3D) comprising a scattering layer and a CeYAG-doped phosphor layer.

For UV applications, silica micro-spheres were placed in the secondary coating. The results show that the angular distribution can change significantly (FIGS. 8 and 9). FIG. 8 shows a light diffusing fiber comprising a random airline core and a standard polymer cladding. As can be seen from the spectrum, the majority of the light is being emitted from the end of the fiber and very little UV light is being scattered. FIG. 9 shows the spectrum of an embodiment of the light diffusing fiber. The fiber in FIG. 9 comprises a random airline silica core, a polymer cladding and a scattering layer comprising $SiO_2$ particles with a scattering loss of ~3 dB/m. As can be seen in FIG. 9, the light is broadly scattered and almost no light is being transmitted out of the end of the fiber. The large angle distribution shown in FIG. 9 is important for maximum distance coverage from surface of the fiber in application where photochemical reactions take place. Measurements for both FIGS. 8 and 9 were done in media that matched the refraction index of the fiber core. This means that in media with smaller refractive index, e.g. air, a lot of light from FIG. 8 would be trapped in the high index secondary coating. However, if the scattering layer is present, even in air most of the light would escape from the secondary coating very efficiently. Therefore, doping of the secondary coating with silica particles both 1) scatters the light from the secondary coating and 2) also helps to reduce the refractive index of the secondary coating thereby making trapping less efficient.

We claim:

1. A light diffusing fiber for emitting white light comprising:

a) a core formed from a silica-based glass;

b) a cladding in direct contact with the core;

c) a scattering layer in direct contact with the cladding; and d) a phosphor layer surrounding and in direct contact with the scattering layer, wherein [the] *a* color of the light emitted, as measured by the CIE 1931 x, y chromacity space, comprises x from about 0.20 to about 0.30 and y from 0.26 to about 0.35*;*

*wherein the scattering layer comprises a plurality of randomly distributed voids or microparticles or nanoparticles of a scattering material.*

2. The light diffusing fiber of claim 1, wherein x is from about 0.23 to about 0.28 and y is from about 0.28 to about 0.33.

3. The light diffusing fiber of claim 1, wherein the color of the light emitted falls within the claimed CIE 1931 x, y values for all viewing angles from about 15° to about 170° relative to the direction of the light diffusing optical fiber.

4. The light diffusing fiber of claim 1, wherein the light diffusing optical fiber emits light having an intensity along the fiber that does not vary by more than about 20%.

5. The light diffusing fiber of claim 1, wherein the scattering induced attenuation loss comprises from about 0.1 dB/m to about 50 dB/m at a wavelength of 550 nm.

6. The light diffusing fiber of claim 1, wherein the core comprises a plurality of randomly distributed voids.

7. The light diffusing fiber of claim 1, wherein the cladding comprises a polymer.

8. The light diffusing fiber of claim 7, wherein the polymer comprises CPC6.

9. The light diffusing fiber of claim 1, wherein the scattering layer comprises a polymer.

10. The light diffusing fiber of claim 9, wherein the polymer comprises CPC6.

[11. The light diffusing fiber of claim 1, wherein the scattering layer comprises a plurality of randomly distributed voids or microparticles or nanoparticles of a scattering material.]

12. The light diffusing fiber of claim [11] *1*, wherein the microparticles or nanoparticles comprise $TiO_2$ or $SiO_2$.

13. The light diffusing fiber of claim 1, further comprising a light emitting device that emits light with a wavelength from about 300 nm to about 450 nm into the core of the light diffusing fiber.

14. The light diffusing fiber of claim 1, wherein the phosphor layer comprises microparticles or nanoparticles of an inorganic phosphorescent or fluorescent material.

15. The light diffusing fiber of claim 14, wherein the inorganic phosphorescent or fluorescent material comprises CeYAG, NdYAG, quantum dots, or nanoparticles.

16. The light diffusing fiber of claim 1, further comprising a secondary layer in between the cladding and scattering layer.

17. A method of producing the light diffusing fiber of claim 1 comprising:

a) forming an optical fiber preform comprising a preform core;

b) drawing the optical fiber preform into an optical fiber;

c) coating the optical fiber with at least one cladding layer;

d) coating the optical fiber with at least one scattering layer; and e) coating the optical fiber with at least one phosphor layer.

*18. A light diffusing fiber for emitting white light comprising:*

*a core formed from a silica-based glass;*

*a cladding in direct contact with the core;*

*a scattering layer in direct contact with the cladding; and*

*a phosphor layer surrounding and in direct contact with the scattering layer, wherein a color of the light emitted, as measured by the CIE 1931 x, y chromacity space, comprises y from about 0.26 to about 0.35;*

*wherein the scattering layer comprises a plurality of randomly distributed voids or microparticles or nanoparticles of a scattering material.*

*19. The light diffusing fiber of claim 18, wherein the color of the light emitted falls within the claimed CIE 1931 x, y values for all viewing angles from about 15° to about 170° relative to the direction of the light diffusing optical fiber.*

*20. The light diffusing fiber of claim 18, wherein the light diffusing optical fiber emits light having an intensity along the fiber that does not vary by more than about 30%.*

*21. The light diffusing fiber of claim 18, further comprising a scattering induced attenuation loss from about 0.1 dB/m to about 50 dB/m at a wavelength of 550 nm.*

*22. The light diffusing fiber of claim 18, wherein the core comprises a plurality of randomly distributed voids.*

*23. The light diffusing fiber of claim 18, wherein the cladding comprises a polymer.*

*24. The light diffusing fiber of claim 23, wherein the polymer comprises CPC6.*

*25. The light diffusing fiber of claim 18, wherein the scattering layer comprises a polymer.*

*26. The light diffusing fiber of claim 25, wherein the polymer comprises CPC6.*

*27. The light diffusing fiber of claim 18, wherein the microparticles or nanoparticles comprise TiO2 or SiO2.*

*28. The light diffusing fiber of claim 18, further comprising a light emitting device that emits light with a wavelength from about 300 nm to about 450 nm into the core of the light diffusing fiber.*

*29. The light diffusing fiber of claim 18, wherein the phosphor layer comprises microparticles or nanoparticles of an inorganic phosphorescent or fluorescent material.*

*30. The light diffusing fiber of claim 29, wherein the inorganic phosphorescent or fluorescent material comprises CeYAG, NdYAG, quantum dots, or nanoparticles.*

*31. The light diffusing fiber of claim 18, further comprising a secondary layer in between the cladding and scattering layer.*

*32. A method of producing the light diffusing fiber of claim 18 comprising:*

*forming an optical fiber preform comprising a preform core;*

*drawing the optical fiber preform into an optical fiber;*

*coating the optical fiber with at least one cladding layer; and*

*coating the optical fiber with at least one scattering layer.*

*33. A light diffusing fiber for emitting white light comprising:*

*a core formed from a silica-based glass;*

*a cladding in direct contact with the core;*

*a scattering layer in direct contact with the cladding; and*

*a phosphor layer surrounding and in direct contact with the scattering layer,*

*wherein the emitted light comprises a combination of a scattered incident light and a scattered fluorescent or phosphorescent light, and has a uniform in color as a function of viewing angle;*

*wherein the scattering layer comprises a plurality of randomly distributed voids or microparticles or nanoparticles of a scattering material.*

*34. The light diffusing fiber of claim 33, wherein the scattered incident light comprises blue light.*

*35. The light diffusing fiber of claim 33, wherein the scattered incident light comprises UV light.*

*36. The light diffusing fiber of claim 33, wherein the color of the light emitted, as measured by the CIE 1931 x, y chromacity space, comprises y from about 0.26 to about 0.35, and wherein the color of the light emitted falls within the claimed CIE 1931 x, y values for all viewing angles from about 15° to about 170° relative to the direction of the light diffusing optical fiber.*

*37. The light diffusing fiber of claim 33, wherein the color of the light emitted, as measured by the CIE 1931 x, y chromacity space, comprises x from about 0.20 to about 0.30 and y from 0.26 to about 0.35.*

*38. The light diffusing fiber of claim 33, wherein the light diffusing optical fiber emits light having an intensity along the fiber that does not vary by more than about 20%.*

*39. The light diffusing fiber of claim 33, further comprising a scattering induced attenuation loss from about 0.1 dB/m to about 50 dB/m at a wavelength of 550 nm.*

*40. The light diffusing fiber of claim 33, wherein the core comprises a plurality of randomly distributed voids.*

*41. The light diffusing fiber of claim 33, wherein either one of or both the cladding and the scattering layer comprises a polymer.*

*42. The light diffusing fiber of claim 33, further comprising a light emitting device that emits light with a wavelength from about 300 nm to about 450 nm into the core of the light diffusing fiber.*

*43. The light diffusing fiber of claim 33, wherein the phosphor layer comprises microparticles or nanoparticles of an inorganic phosphorescent or fluorescent material.*

*44. The light diffusing fiber of claim 43, wherein the inorganic phosphorescent or fluorescent material comprises CeYAG, NdYAG, quantum dots, or nanoparticles.*

*45. The light diffusing fiber of claim 33, further comprising a secondary layer in between the cladding and scattering layer.*

* * * * *